April 28, 1970   J. E. BLAIR   3,508,596
SAFETY INFLATABLE TIRE MOUNT FOR VEHICLE WHEELS
Filed Feb. 5, 1968
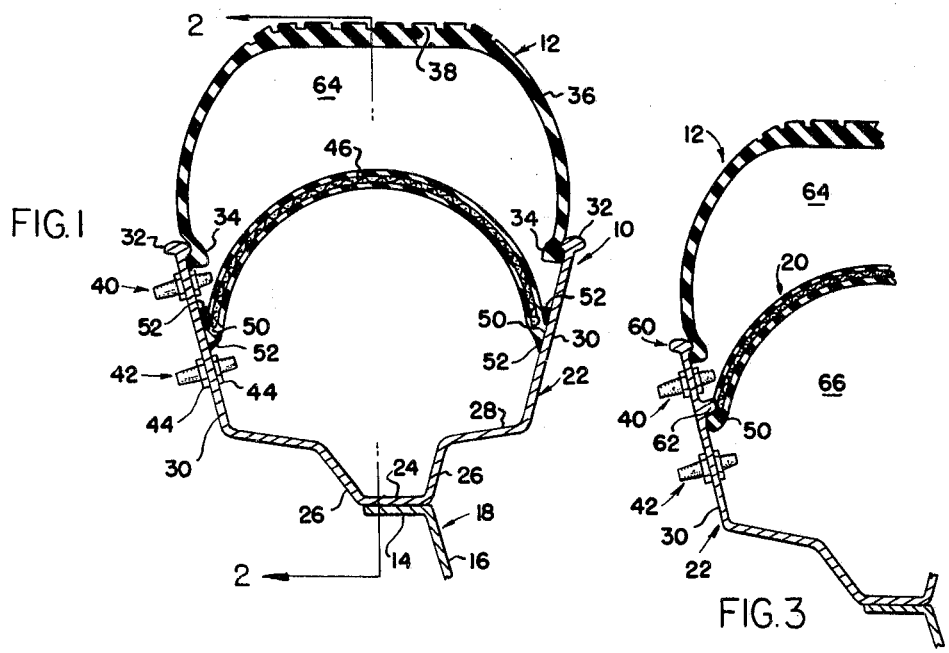
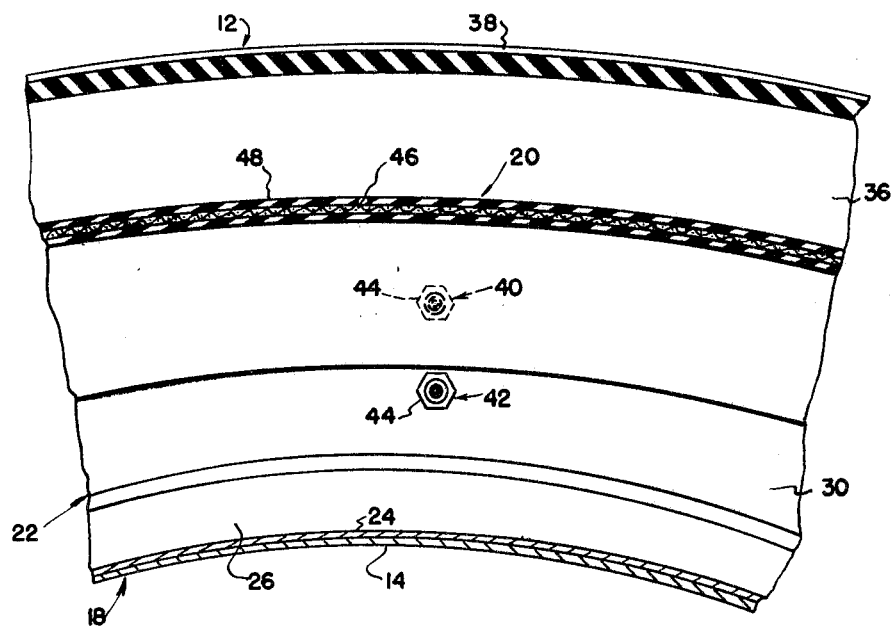
INVENTOR
JOHNNY E. BLAIR
BY Barthel & Bugbee
ATTORNEYS

United States Patent Office 3,508,596
Patented Apr. 28, 1970

3,508,596
SAFETY INFLATABLE TIRE MOUNT FOR
VEHICLE WHEELS
Johnny E. Blair, P.O. Box 3,
Van, W. Va. 25206
Filed Feb. 5, 1968, Ser. No. 703,008
Int. Cl. B60c 17/00
U.S. Cl. 152—340                              2 Claims

ABSTRACT OF THE DISCLOSURE

A channel-shaped vehicle wheel rim has a composite inflatable liner of steel and rubber-like material either permanently bonded to the rim side walls or detachably secured thereto and provided with an inflation valve for admitting compressed air or other gas to the space between the liner and the rim. A second inflation valve is provided outwardly of the liner for inflating the conventional tubeless tire casing which is removably secured to the rim by the usual interlocking bead construction. The central portion of the inflated liner projects outwardly beyond the edges of the rim in such a manner as to sustain the load of the vehicle in the event of a puncture or blowout releasing the air from the tire, so that the vehicle operator may continue to drive, without danger or damage, a sufficient distance to reach tire repair or replacement facilities.

---

In the drawings:

FIGURE 1 is a fragmentary radial section through the peripheral portion of a safety inflatable tire mount equipped with a conventional tubeless tire casing according to one form of the invention, wherein the inflatable liner is permanently bonded to the rim side wall;

FIGURE 2 is a fragmentary circumferential section taken along the line 2—2 in FIGURE 1; and FIGURE 3 is a radial section similar to FIGURE 1 but showing a modification wherein the inflatable liner is detachably secured to the rim.

Referring to the drawing in detail, FIGURES 1 and 2 show a safety inflatable tire mount, generally designated 10, according to one form of the invention for detachably receiving a conventional independently-inflated tubeless tire casing 12 as described more fully below. The tire mount 10 is welded or otherwise secured to the peripheral flange 14 of the web 16 of a vehicle wheel, generally designated 18, which is centrally bolted in the usual way to the conventional wheel hub (not shown) of the vehicle. The inflatable tire mount 10 consists generally of a composite inflatable and expansible liner 20 secured to an annular channel-shaped rim 22. The rim 22 includes an annular cylindrical portion or bottom wall 24 of the same width as the wheel flange 14 and welded or otherwise secured thereto, inner flared opposite side walls 26, intermediate side walls 28 disposed at obtuse angles to the inner side walls 26, and outer side walls 30 extending outwardly at acute angles to one another from the intermediate side walls 28. The peripheries of the outer side walls 30 terminate in annular enlargements or beads 32 which project inwardly toward one another for engagement by the outwardly-directed beads 34 at the inner peripheries of the side walls 36 of the tire 12, which has a conventional tread 38.

The tire 12 is inflated independently of the inflatable mount 10 by an outer inflation valve 40 mounted in the suitable drilled peripheral portion of the outer rim side wall 30. The inner portion of one of the outer rim side wall 30 is also drilled to receive an inner inflation valve 42. The outer and inner inflation valves 40 and 42 are of conventional construction, available upon the open market, and well-known to those skilled in the vehicle tire art. They have externally and internally-threaded stems which respectively receive spring-pressed valve cores and closure caps (not shown). The inflation valves 40 and 42 are secured and sealed against air leakage by lock nut and washer units 44 in the usual manner.

The liner 20 is preferably of composite construction and of convexly arcuate cross-section with a flexible penetration-resistant metallic insert 46 adapted to deflect nails or other puncture-causing agents. The insert 46 of the liner 20 may be composed of steel mesh or, in the alternative, small overlapping steel discs or plates which in either case impart flexibility while presenting a substantially impenetrable obstacle to such puncture-causing agents. The insert 46 is embedded in the liner body 48, which is of elastomeric material such as natural or synthetic rubber. The embedding of the insert 46 is accomplished during the molding operation for producing the composite liner 20. It will be understood that both the insert 46 and the liner body 48 are of annular or toroidal shape so as to extend entirely around the rim 22. The peripheral edges of the liner 20 have beads 50 thereon which are permanently bonded at annular junctions 52 to the inner surface of the outer rim portion 30 so as to effect a permanent air-tight seal and gripping action therebetween.

The modified inflatable tire mount, generally designated 60, shown in FIGURE 3 is in almost all respects similar to that shown in FIGURE 1, hence similar reference numerals are used to designate similar parts. In the modified inflatable tire mount 60, however, the inflatable liner 20 is detachably secured to the rim 22 by having its beads 50 at its inner peripheral edges engaging internal annular ribs 62 on the inner surfaces of outer side walls 30 of the rim 22. The conventional tire 12 and the inflation means of it and the composite liner 20 remain the same as in FIGURES 1 and 2.

In the use of the safety inflatable tire mounts 10 or 60, the spaces or chambers 64 and 66 within the tire 12 and inflatable liner 20 are separately and independently inflated through their respective inflation valves 40 and 42. The inner chamber 66 is inflated to a sufficiently high pressure, such as 60 pounds per square inch, to cause the central portion of the liner 20 to project beyond the rim beads 32 even when the outer chamber 64 has become completely deflated as in the case of a puncture or a blowout. In such event, the inflated inner liner and rim unit 10 sustain the weight of the vehicle while it is being driven to a location having tire repair or replacement facilities.

The liner 20 is not subjected to wear, except in the case of a puncture or blowout of the tire 12, hence can ordinarily remain in place for the life of the vehicle. Even if a nail, tack or the like penetrates the tire 12, it will usually be deflected by the metallic insert 46 so that it does not penetrate the inflated inner chamber 66. If, however, for any reason it is desired to render the liner 20 detachable, the modified rim construction shown in FIGURE 3 is adopted, with the internal ribs 62 normally holding the liner beads 50 in assembly during inflation.

Upon deflation, of the inner chamber 66 by opening the inner inflation valve 42, the inner liner 20 may be pried off the rim beads 50 and removed from the rim 22. Ordinarily, the bonding at 52 (FIGURE 1) of the beads 50 of the liner 20 to the outer rim side wall 30 causes the liner 20 to become an integral part of the rim 22, these components 20 and 22 together forming the safety inflatable rim unit 10. As a consequence, a succession of conventional tires 12 may be worn out one by one and replaced with new tires on the same inflatable rim unit 10. Furthermore, a blowout on a front tire 12 will not cause the vehicle to swerve dangerously or leave the road, because the inflatable rim unit 10 instantly assumed the load and enables the operator to continue on his journey until he reaches a place where assistance or a new tire can be obtained and installed.

While the convexly-arcuate shape of the liner 20 shown in the drawing is a satisfactory shape, it will be understood that any other suitable shape may be used, such as, for example, the centrally-flattened shape of the tire casing 12 shown in FIGURE 1. It will also be understood that the space between the tire casing 12 and the liner 20 may be varied from that shown in the drawing and that its puncture-resistance insert 46 may be omitted, if desired, in order to reduce the cost thereof.

I claim:

1. A safety inflatable tire mount for a vehicle wheel, comprising
   an annular tire-holding rim of channel cross-section adapted to be secured to a vehicle wheel and having a bottom wall and opposite side walls extending outward from said bottom wall,
      said side walls having outer peripheral edge portions configured to receive and grip an inflated conventional tire in sealing engagement therewith,
   an annular flexible liner of outwardly-convex cross-section disposed in the channel of said rim and having opposite inner peripheral edge portions secured to said rim side walls in air-tight engagement therewith at locations inwardly of said rim edge portions,
   and means on said rim for supplying a compressed inflating gas to said liner,
      said liner being permanently bonded to said rim side walls.

2. A safety inflatable tire mount for a vehicle wheel, according to claim 1, wherein said gas supply means includes an inner inflation valve extending through one of said rim side walls inwardly of one of said inner peripheral edge portions of said liner, and wherein there is also provided an outer inflation valve also extending through one of said rim side walls at a location spaced away from the bonded junction of said liner with said rim and also spaced outwardly away from said inner inflation valve for supplying compressed gas to the space disposed outwardly of said liner and internally of a tire secured to said rim.

References Cited
UNITED STATES PATENTS

| | | | |
|---|---|---|---|
| 2,560,609 | 7/1951 | Van Hulzen | 152—339 |
| 2,680,463 | 6/1954 | Khalil | 152—339 |
| 2,822,015 | 2/1958 | Petrasek | 152—341 |

JOSEPH R. LECLAIR, Primary Examiner